US008449394B2

(12) United States Patent
Buchholz et al.

(10) Patent No.: US 8,449,394 B2
(45) Date of Patent: May 28, 2013

(54) PLUG-IN ARCHITECTURE FOR A WAGERING GAME NETWORK

(75) Inventors: Dale R. Buchholz, Palatine, IL (US); Damon E. Gura, Chicago, IL (US); Larry Pacey, Chicago, IL (US); Craig J. Sylla, Round Lake, IL (US); Travis Whidden, Las Vegas, NV (US); Timothy D. Wilson, Oak Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 93 days.

(21) Appl. No.: 12/665,162

(22) PCT Filed: Jun. 19, 2008

(86) PCT No.: PCT/US2008/007648
§ 371 (c)(1),
(2), (4) Date: Dec. 17, 2009

(87) PCT Pub. No.: WO2008/156809
PCT Pub. Date: Dec. 24, 2008

(65) Prior Publication Data

US 2010/0190553 A1 Jul. 29, 2010

Related U.S. Application Data

(60) Provisional application No. 60/945,004, filed on Jun. 19, 2007.

(51) Int. Cl.
*G06F 17/00* (2006.01)

(52) U.S. Cl.
USPC .......... 463/42

(58) Field of Classification Search
USPC .......... 463/4, 5, 9, 16–25, 42
See application file for complete search history.

(56) References Cited

U.S. PATENT DOCUMENTS

| | | | | |
|---|---|---|---|---|
| 6,385,567 | B1 | 5/2002 | Lew et al. | |
| 2002/0052727 | A1 | 5/2002 | Bond et al. | |
| 2003/0069074 | A1 | 4/2003 | Jackson | |
| 2004/0014526 | A1 | 1/2004 | Kulas | |
| 2004/0038740 | A1 | 2/2004 | Muir | |
| 2006/0035707 | A1 | 2/2006 | Nguyen et al. | |
| 2007/0112714 | A1 | 5/2007 | Fairweather | |
| 2007/0135216 | A1 | 6/2007 | Martinek et al. | |
| 2007/0202941 | A1* | 8/2007 | Miltenberger et al. | 463/25 |
| 2008/0070688 | A1* | 3/2008 | Loehrer | 463/42 |
| 2008/0076573 | A1* | 3/2008 | Loehrer | 463/42 |
| 2008/0082985 | A1* | 4/2008 | Gagner et al. | 719/312 |
| 2009/0325686 | A1* | 12/2009 | Davis et al. | 463/25 |

FOREIGN PATENT DOCUMENTS

WO WO-2006002084 A1 1/2006

OTHER PUBLICATIONS

"International Application Serial No. PCT/US2008/07648, Search Report and Written Opinion mailed on Oct. 2, 2008", 11 pgs.
"U.S. Appl. No. 11/570,407, Non Final Office Action mailed Nov. 30, 2011", 21 pgs.
"Australian Application Serial No. 2008266787, First Examiners Report mailed Mar. 27, 2012", 3 pgs.

(Continued)

*Primary Examiner* — Ronald Laneau
(74) *Attorney, Agent, or Firm* — Schwegman Lundberg & Woessner, P.A.

(57) ABSTRACT

A plug-in architecture for a wagering game network is described. Plug-in modules may provide various functions for services related to wagering games. Such functions may include random number generation, user interface functions, player tracking functions, central determinant functions etc. The plug-ins are dynamically loaded during the run-time of an application or service.

36 Claims, 6 Drawing Sheets

OTHER PUBLICATIONS

Singh, Amit, "An Introduction to Virtualization", retrieved from http://www.kernelthread.com/publications/virtualization/ on Nov. 15, 2011, (Jan. 2004), 1-26.

"U.S. Appl. No. 11/570,407, Response filed Aug. 15, 2012 to Final Office Action mailed Jun. 15, 2012", 7 pgs.

"U.S. Appl. No. 11/570,407, Advisory Action mailed Aug. 24, 2012", 3 pgs.

"U.S. Appl. No. 11/570,407, Response filed Nov. 15, 2012 to Advisory Action mailed Aug. 24, 2012", 8 pgs.

"International Application Serial No. PCT/US2005/021144, International Search Report mailed Nov. 3, 2005", 5 pgs.

"International Application Serial No. PCT/US2005/021144, Written Opinion mailed Nov. 3, 2005", 3 pgs.

* cited by examiner

PLUG-IN ARCHITECTURE FOR A WAGERING GAME NETWORK

RELATED APPLICATION

This patent application is a U.S. National Stage Filing under 35 U.S.C. 371 from International Patent Application Serial No. PCT/US2008/007648, filed Jun. 19, 2008, and published on Dec. 24, 2008, as WO 2008/156809 Al, which claims the priority benefit of U.S. Provisional Patent Application Serial No. 60/945,004 filed Jun. 19, 2007 and entitled "PLUG-IN ARCHITECTURE FOR A WAGERING GAME NETWORK", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

FIELD

Embodiments of the inventive subject matter relate generally to software for wagering game networks, and more particularly to providing plug-in capabilities for servers, applications and wagering game machines on a wagering game network.

BACKGROUND

Today's wagering game machine typically comprises a computerized system controlling a video display or reels that provide wagering games such as slots, video card games (poker, blackjack etc.), video keno, video bingo, video pachinko and other games typical in the gaming industry. Additionally, wagering game machines may be part of a wagering game network of machines and servers. In conventional systems, the software controlling the computerized system has been primarily proprietary software, including both the operating system and gaming software. Additionally, in previous systems the wagering game software has been provided as a single monolithic system. That is, all of the software is built and provided as a single product or unit, typically on a persistent storage device such as a flash memory, a compact flash memory, EEPROM or a hard disk.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

Figure 1:
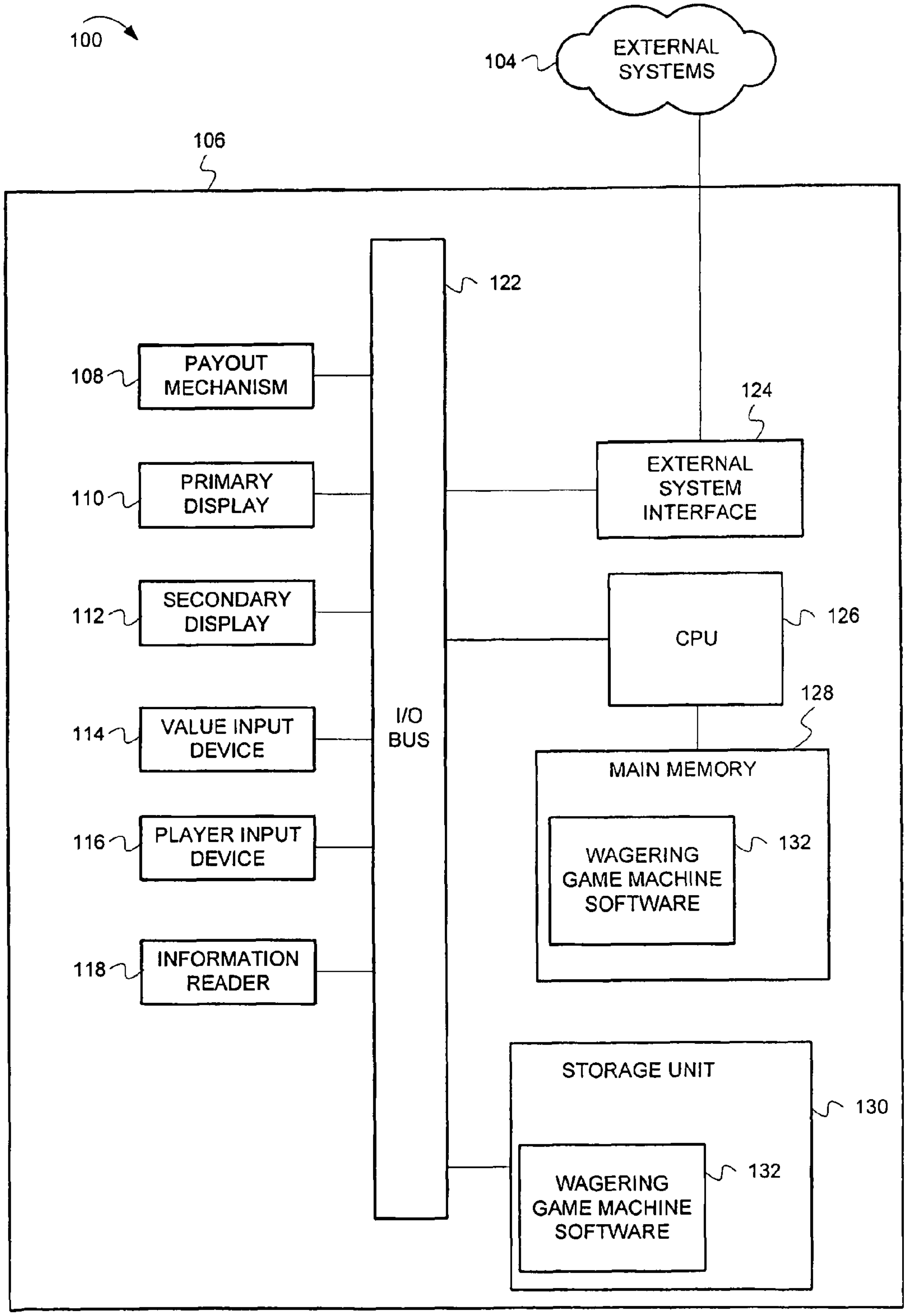
FIG. 1 is a block diagram illustrating a wagering game machine architecture according to example embodiments of the invention.

FIG. 1 is a block diagram illustrating a wagering game machine architecture, including a control system, according to example embodiments of the invention. As shown in FIG. 1, the wagering game machine 106 includes a central processing unit (CPU) 126 connected to main memory 128, which includes a wagering game machine software 132. In one embodiment, the wagering game machine software 132 can present wagering games, such as video poker, video black jack, video slots, video lottery, etc., in whole or part.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

In one embodiment, the wagering game machine 106 can include additional peripheral devices and/or more than one of each component shown in FIG. 1. For example, in one embodiment, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine 106 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
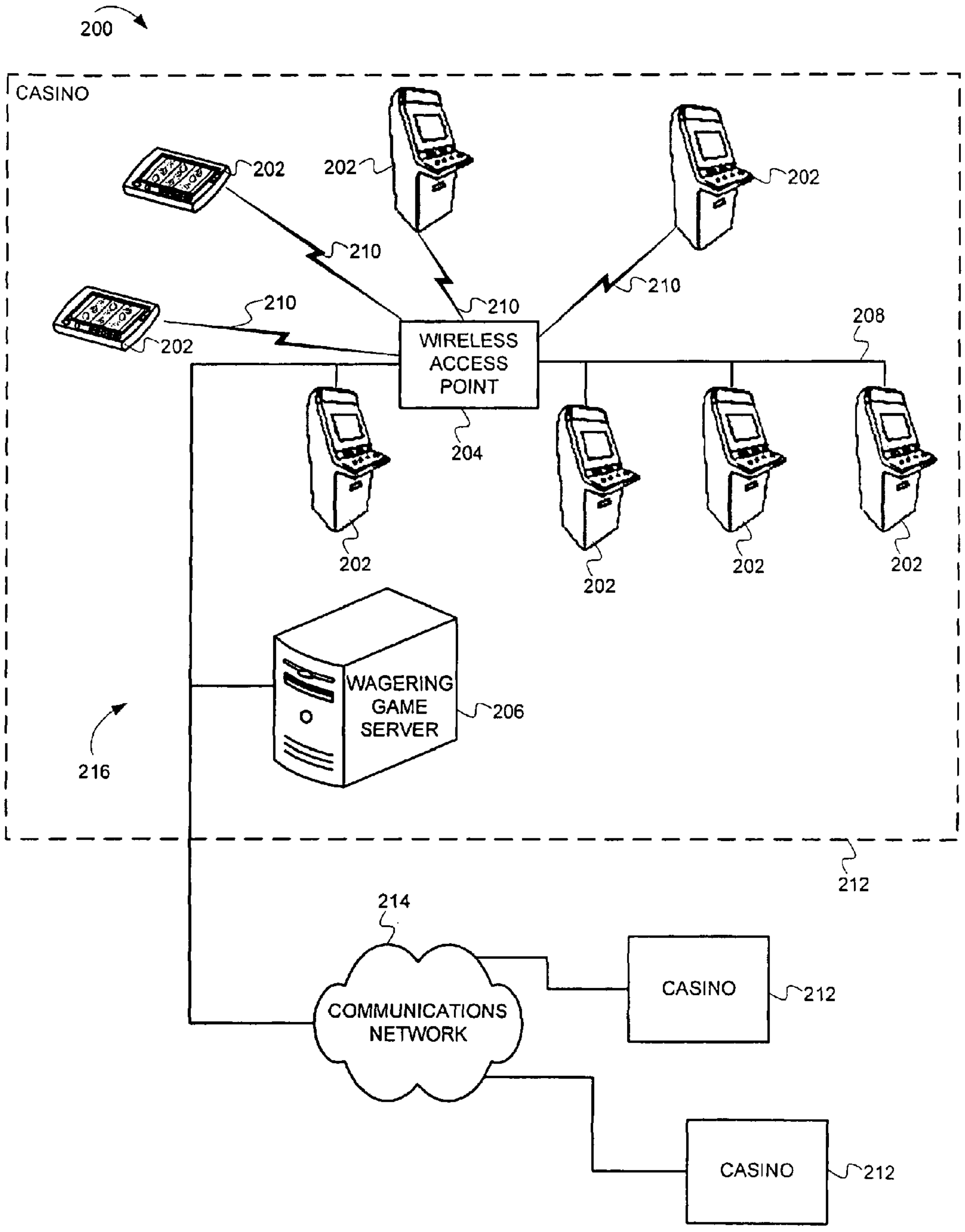
FIG. 2 is a block diagram illustrating a wagering game network, according to example embodiments of the invention.

While FIG. 1 describe example embodiments of a wagering game machine architecture, FIG. 2 shows how a plurality of wagering game machines can be connected in a wagering game network.

Example Wagering Game Network

FIG. 2 is a block diagram illustrating a wagering game network 200, according to example embodiments of the invention. As shown in FIG. 2, the wagering game network 200 includes a plurality of casinos 212 connected to a communications network 214.

Each of the plurality of casinos 212 includes a local area network 216, which may include a wireless access point 204, wagering game machines 202, and a wagering game server 206 that can serve wagering games over the local area network 216. As such, the local area network 216 includes wireless communication links 210 and wired communication links 208. The wired and wireless communication links can employ any suitable connection technology, such as Bluetooth, 802.11, Ethernet, public switched telephone networks, SONET, etc. In one embodiment, the wagering game server 206 can serve wagering games and/or distribute content to devices located in other casinos 212 or at other locations on the communications network 214.

The wagering game machines 202 and wagering game server 206 can include hardware and machine-readable media including instructions for performing the operations described herein.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

In various embodiments, wagering game machines 202 and wagering game servers 206 work together such that a wagering game machine 202 may be operated as a thin, thick, or intermediate client. For example, one or more elements of game play may be controlled by the wagering game machine 202 (client) or the wagering game server 206 (server). Game play elements may include executable game code, lookup tables, configuration files, game outcome, audio or visual representations of the game, game assets or the like. In a thin-client example, the wagering game server 206 may perform functions such as determining game outcome or managing assets, while the wagering game machine 202 may be used merely to present the graphical representation of such outcome or asset modification to the user (e.g., player). In a thick-client example, game outcome may be determined locally (e.g., at the wagering game machine 202) and then communicated to the wagering game server 206 for recording or managing a player's account.

Similarly, functionality not directly related to game play may be controlled by the wagering game machine 202 (client) or the wagering game server 206 (server) in embodiments. For example, power conservation controls that manage a display screen's light intensity may be managed centrally (e.g., by the wagering game server 206) or locally (e.g., by the wagering game machine 202). Other functionality not directly related to game play may include presentation of advertising, software or firmware updates, system quality or security checks, etc.

Example Wireless Environment

In some embodiments, the wireless access point 204 can be part of a communication station, such as wireless local area network (WLAN) communication station including a Wireless Fidelity (WiFi) communication station, or a WLAN access point (AP). In these embodiments, the wagering game machines 202 can be part of a mobile station, such as WLAN mobile station or a WiFi mobile station.

In some other embodiments, the wireless access point 204 can be part of a broadband wireless access (BWA) network communication station, such as a Worldwide Interoperability for Microwave Access (WiMax) communication station, as the wireless access point 204 can be part of almost any wireless communication device. In these embodiments, the wagering game machines 202 can be part of a BWA network communication station, such as a WiMax communication station.

In some embodiments, any of the wagering game machines 202 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the wireless access point 204 and the wagering game machines 202 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 204 and the wagering game machines 202 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 204 and the wagering game machines 202 can communicate in accordance with standards such as the Pan-European mobile system standard referred to as the Global System for Mobile Communications (GSM). In some embodiments, the wireless access point 204 and the wagering game machines 202 can also communicate in accordance with packet radio services such as the General Packet Radio Service (GPRS) packet data communication service. In some embodiments, the wireless access point 204 and the wagering game machines 202 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 204 and the wagering game machines 202 can provide packet data services (PDS) utilizing packet data protocols (PDP). In other embodiments, the wireless access point 204 and the wagering game machines 202 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 204 and the wagering game machines 202 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 204 and the wagering game machines 202 can communicate in accordance with an ultra-wideband (UWB) communication technique where a carrier frequency is not used. In other embodiments, the wireless access point 204 and the wagering game machines 202 can communicate in accordance with an analog communication technique. In other embodiments, the wireless access point 204 and the wagering game machines 202 can communicate in accordance with an optical communication technique, such as the Infrared Data Association (IrDA) standard. In some embodiments, the wireless access point 204 and the wagering game machines 202 can communicate in accordance with the Home-RF standard which can be in accordance with a Home-RF Working Group (HRFWG) standard.

Figure 3:
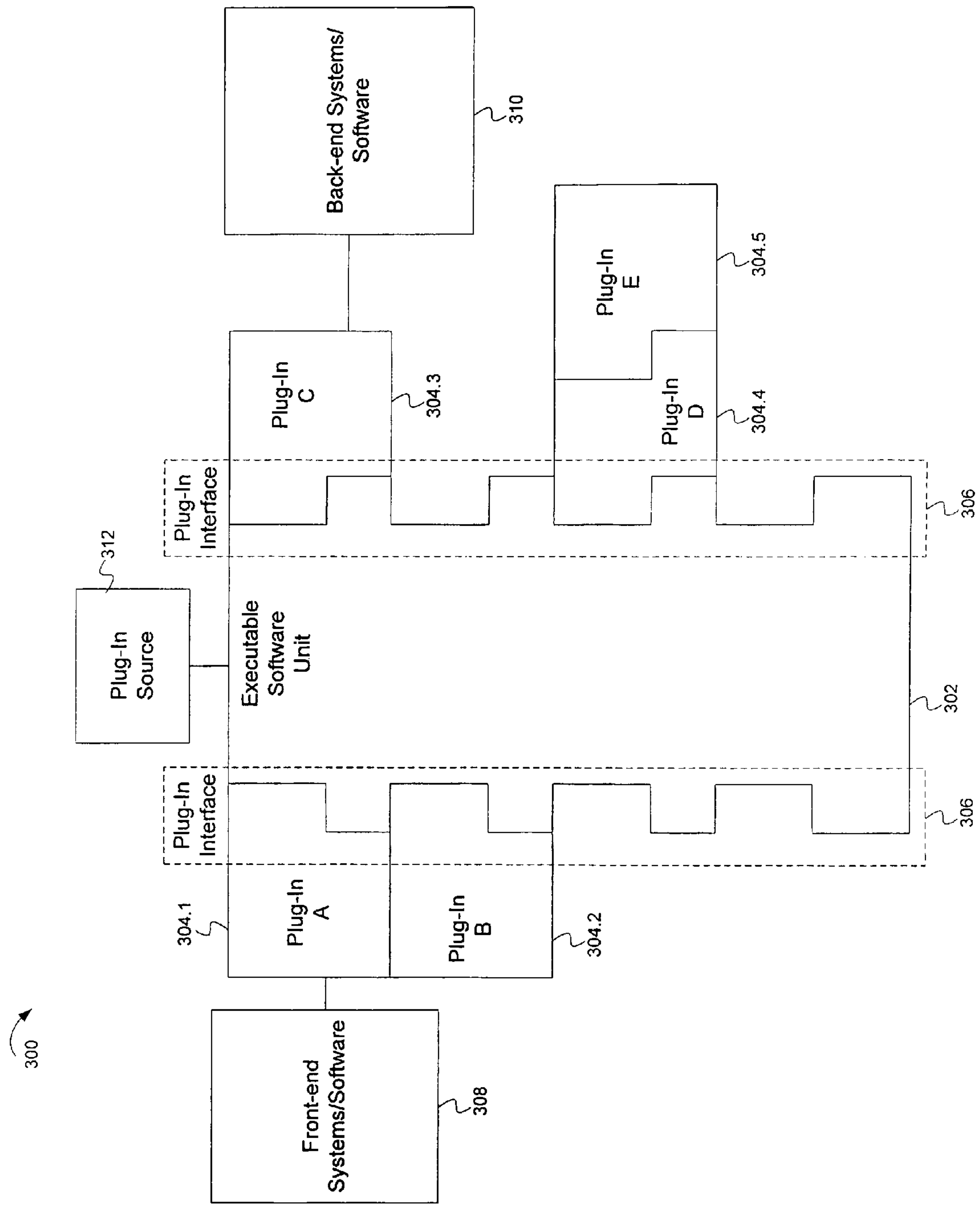
FIG. 3 is a block diagram illustrating a plug-in architecture for a executable software unit according to embodiments of the invention.

FIG. 3 is a block diagram illustrating a plug-in architecture 300 for a executable software unit according to embodiments of the invention. In some embodiments, architecture 300 includes an executable software unit 302, plug-ins 304 and a plug-in interface 306.

Executable software unit 302 may be an application, service or daemon that runs on a wagering game machine 202 or server 206. Executable software unit 302 may provide any of a number of functions in the wagering game network illustrated in FIG. 2. For example, executable software unit 302 may a wagering game application 132 that present a wagering game on a wagering game machine. Executable software unit 302 may provide a service such as a player tracking service, a cashless gaming service, a progressive service or any other type of service on a server 206 or wagering game machine 202.

Plug-in 304 (also sometimes referred to as an "add-in" or "extension") comprises executable code that typically provides specific functions for an application, and may provide the function on demand by being called by the application (e.g. executable software unit 302). The functions provided by the plug-in may add new features, extend existing features, or provide a translation from one format or protocol to another format or protocol for the executable software unit 302. A plug-in is loaded dynamically, that is, during the run-time of the executable software unit 302. Further, executable software unit 302 is typically independent of plug-in 304. That is, plug-ins may be added or updated without changes to the executable software unit 302.

Plug-in interface 306 provides or defines the way that an executable software unit 302 makes use of the function or functions provided by plug-in 304. In some embodiments, plug-in interface 306 comprises a dynamic link library (DLL) or shared object (.so) style interface, and the plug-in registers functions or methods with the executable software unit 302 to notify the executable software unit 302 of the functions or methods the plug-in 304 provides, or the events that the plug-in 304 may handle.

In alternative embodiments, plug-in interface 306 may comprise a dynamic link library or a shared object library the provides a single entry point, for example a "main" function for the plug-in, that receives one or more data structures that are used to define the interaction between the executable software unit 302 and plug-in 304. For example, a field in the data structure may be used to define a command or action that the executable software unit 302 desires the plug-in 304 to perform, while other fields in the data structure may be used to provide supporting parameters or input and output data for the action. Further, a property list for the plug-in may be used to define the properties of the plug-in, e.g., the type of plug-in and the functionality provided by the plug-in.

Other types of plug-in interfaces of frameworks may be used and are within the scope of the inventive subject matter. For example, plug-in frameworks such as AL Platform, FxEngine Framework, Mono Addins for .NET, Java Plug-in Framework (JPF), or other plug-in frameworks may be used.

The plug-in interface may be published to allow third parties to develop plug-ins 304 for various applications or other executable software units 302.

An executable software unit 302 obtains one or more plug-ins 304 from a plug-in source 312. In some embodiments, the plug-in source 312 may be a predetermined directory or folder that is used by the executable software unit 302 as a source for plug-ins. In these embodiments, a plug-in is "installed" by placing the plug-in in the predetermined directory or folder. In alternative embodiments, the executable software unit 302 may obtain plug-ins from a network source, such as from a server 206 on a wagering game network. In further alternative embodiments, the location of plug-ins 304 may be specified using a plug-in registry.

As noted above, plug-ins may provide features or extensions for an executable software unit such as an application or wagering game program. In some embodiments, the plug-in may provide user interface features for an application, for example, an Administrative, Operations and Maintenance (AOM) console application. A plug-in may provide user-interface elements such as menus, configuration windows, or pop-ups that add functions to the AOM console or make existing functions easier to use. Further, plug-ins may be used to adapt or customize an application for different environments.

Further, a plug-in may be used to configure parameters for a wagering game or a server based game application. For example, a plug-in may be used to specify or control the hold percentage or other wagering game parameter.

Additionally, a plug-in may be used to convert an existing wagering game to a new format. For example, a plug-in may provide an extended user interface to adapt an existing wagering game application to one that may be used in a wagering game portal environment.

Still further, a plug-in may provide a basic wagering game function such as a random number generator (RNG). A party that wishes to concentrate on wagering game development may wish to use such a plug-in to avoid expending time and resources on an RNG when RNGs are available as a plug-in.

Also, plug-ins may be used to adapt applications using one protocol to use new or additional protocols. For example, a wagering game application using a proprietary communications protocol may use a plug-in to convert the proprietary protocol to a standard protocol such as G2S (Game to System) or S2S (System to System) protocols as defined by the Gaming Standards Association.

Other functions that may be provided by plug-ins include communications services, scripting services, database access services license management, encryption, file formatting and conversion, authentication, persistent state management, player tracking services, accounting services, virtualization services, central determinant services, account management services, etc.

In each of the cases above, the plug-in may be updated, enhanced, or otherwise modified without requiring a rebuild of the applications or other executable software units using the plug-ins. Further, plug-ins may be used to adapt an application for particular environments. For example, a one RNG plug-in may be used in some jurisdictions where the RNG method is approved, while a second RNG plug-in may be used in other jurisdictions requiring a different RNG mechanism.

Plug-ins may provide an interface between an application, service or other executable software unit and front-end systems 308 and back-end systems 310. In general, front-end systems 308 are systems involved in presenting a wagering game application to an end user. Thus plug-ins related to RNG, central determinant systems, and game play related plug-ins may interface between a server application and a wagering game. Back-end systems are generally systems that are not involved with the presentation of a wagering game to a player, but provide useful or essential services for a gaming establishment. Thus plug-ins related to player tracking, accounting, database access, file formatting etc. may interface between an application and back-end systems such as player tracking systems, accounting systems etc.

Further, it should be noted that plug-ins may use other plug-ins. In the example provided in FIG. 3, plug-in 304.4 makes use of functions provided by plug-in 304.5.

Example Operations

Figure 4:
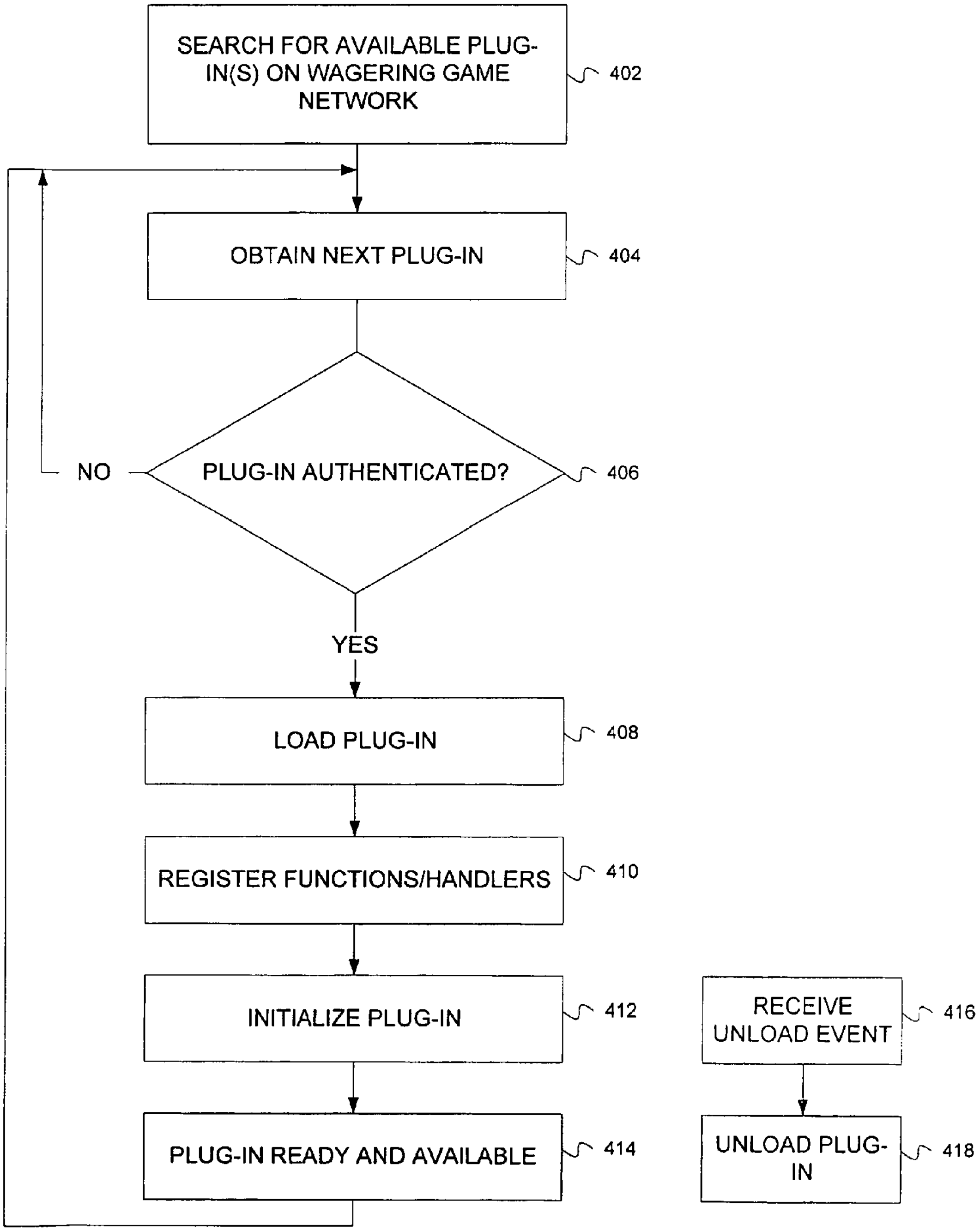
FIG. 4 is a flow chart illustrating methods according to embodiments of the invention.

FIG. 4 is a flow chart illustrating methods for a plug-in architecture according to embodiments of the invention. The method starts at block 402, where an application using a plug-in searches for available plug-ins. In some embodiments, a predetermined (e.g. a "well known") director or folder (or subdirectories of a predetermined directory or folder) are searched for files of a certain type. For example, a predetermined directory or folder may be searched for dynamic link libraries or shared object libraries. Each library in the directory may be a plug-in.

In alternative embodiments, a plug-in server may be queried for available plug-ins. In further alternative embodiments, a registry of available plug-ins may be searched.

Next, at block 404, the applications obtains an available plug-in that was found during the search. If no plug-ins are available, the method ends. Otherwise, if a plug-in is available, the method continues.

In some embodiments, the plug-in may be checked to see if it is authentic or otherwise permitted for use. Various authentication mechanisms may be used, including digital signatures, certificates, MD5, SHA1 or any other authentication mechanism may be used in various embodiments. If the plug-in is not authenticated, the method may return to block 404 to obtain the next available plug-in. Otherwise the method continues.

At block 408, the plug-in may be loaded into an application or service. In some embodiments, loading a plug-in includes dynamically resolving function or method links and references.

At block 410, the plug-in may register functions with an application. Registering a function makes it known to the application so that the application may use the function or functions provided by the plug-in. In some embodiments, the function that is registered may be referred to as a "callback" function. Additionally, the plug-in may register event handlers with an application. Event handlers are functions or methods that may be invoked upon the occurrence of a particular event. For example, a plug-in event handler may wish to be notified every time a wagering game application is played, or every time a win occurs on a wagering game application.

At block 412, the plug-in may be initialized. That is, the plug-in may perform certain functions that are done at startup. For example, the plug-in may need to connect with a database, initialize memory etc.

At block 414, the plug-in is ready and available for use by an application or service. The method may then return to block 404 to obtain the next available plug-in.

At any point during the above method, or after the plug-in is ready and available, the plug-in may receive an unload event at block 416. For example, an error in the application or in the plug-in may trigger an unload event. Further, an unload event may be triggered if a wagering game application or service is to be shut down or otherwise terminated. Further, an unload event may be triggered when a plug-in is to be updated or modified.

Upon receiving an indication that the plug-in is to be unloaded, at block 418 the method unloads the plug-in. Unloading a plug-in may involve flushing records to a database, closing files, shutting down communications connections, releasing memory etc. such that the plug-in cleanly exits.

Example Wagering Game Machines

Example Wagering Game Machine

Figure 5:
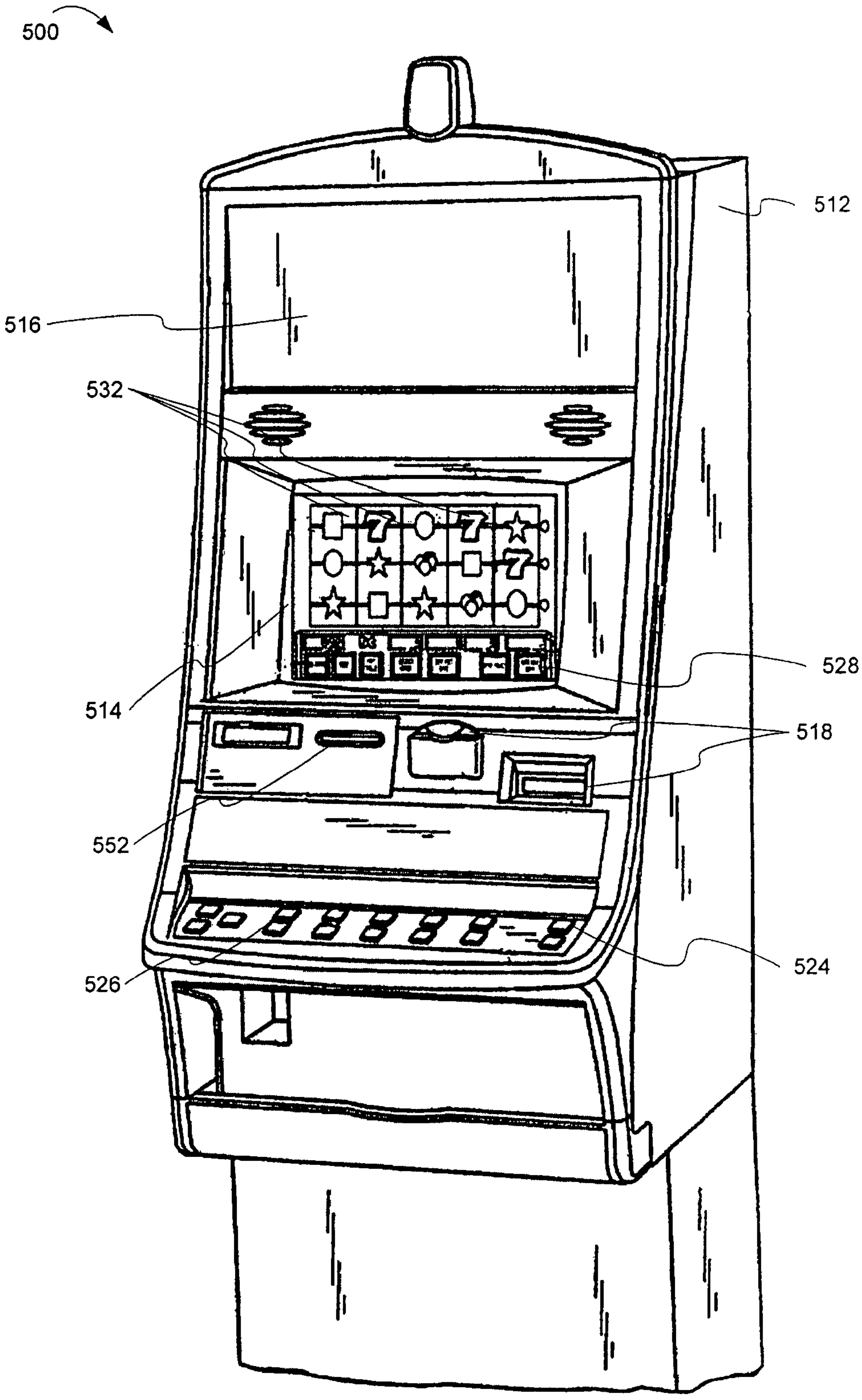
FIG. 5 is a perspective view of a wagering game machine, according to example embodiments of the invention.

FIG. 5 is a perspective view of a wagering game machine, according to example embodiments of the invention. Referring to FIG. 5, a wagering game machine 500 is used in gaming establishments, such as casinos. According to embodiments, the wagering game machine 500 can be any type of wagering game machine and can have varying structures and methods of operation. For example, the wagering game machine 500 can be an electromechanical wagering game machine configured to play mechanical slots, or it can be an electronic wagering game machine configured to play video casino games, such as blackjack, slots, keno, poker, blackjack, roulette, etc.

The wagering game machine 500 comprises a housing 512 and includes input devices, including value input devices 518 and a player input device 524. For output, the wagering game machine 500 includes a primary display 514 for displaying information about a basic wagering game. The primary display 514 can also display information about a bonus wagering game and a progressive wagering game. The wagering game machine 500 also includes a secondary display 516 for displaying wagering game events, wagering game outcomes, and/or signage information. While some components of the wagering game machine 500 are described herein, numerous other elements can exist and can be used in any number or combination to create varying forms of the wagering game machine 500.

The value input devices 518 can take any suitable form and can be located on the front of the housing 512. The value input devices 518 can receive currency and/or credits inserted by a player. The value input devices 518 can include coin acceptors for receiving coin currency and bill acceptors for receiving paper currency. Furthermore, the value input devices 518 can include ticket readers or barcode scanners for reading information stored on vouchers, cards, or other tangible portable storage devices. The vouchers or cards can authorize access to central accounts, which can transfer money to the wagering game machine 500.

The player input device 524 comprises a plurality of push buttons on a button panel 526 for operating the wagering game machine 500. In addition, or alternatively, the player input device 524 can comprise a touch screen 528 mounted over the primary display 514 and/or secondary display 516.

The various components of the wagering game machine 500 can be connected directly to, or contained within, the housing 512. Alternatively, some of the wagering game machine's components can be located outside of the housing 512, while being communicatively coupled with the wagering game machine 500 using any suitable wired or wireless communication technology.

The operation of the basic wagering game can be displayed to the player on the primary display 514. The primary display 514 can also display a bonus game associated with the basic wagering game. The primary display 514 can include a cathode ray tube (CRT), a high resolution liquid crystal display (LCD), a plasma display, light emitting diodes (LEDs), or any other type of display suitable for use in the wagering game machine 500. Alternatively, the primary display 514 can include a number of mechanical reels to display the outcome. In FIG. 5, the wagering game machine 500 is an "upright" version in which the primary display 514 is oriented vertically relative to the player. Alternatively, the wagering game machine can be a "slant-top" version in which the primary display 514 is slanted at about a thirty-degree angle toward the player of the wagering game machine 500. In yet another embodiment, the wagering game machine 500 can exhibit any suitable form factor, such as a free standing model, bartop model, mobile handheld model, or workstation console model.

A player begins playing a basic wagering game by making a wager via the value input device 518. The player can initiate play by using the player input device's buttons or touch screen 528. The basic game can include arranging a plurality of symbols along a payline 532, which indicates one or more outcomes of the basic game. Such outcomes can be randomly selected in response to player input. At least one of the outcomes, which can include any variation or combination of symbols, can trigger a bonus game.

In some embodiments, the wagering game machine 500 can also include an information reader 552, which can include a card reader, ticket reader, bar code scanner, RFID transceiver, or computer readable storage medium interface. In some embodiments, the information reader 552 can be used to award complimentary services, restore game assets, track player habits, etc.

Example Wagering Game Machine

Figure 6:
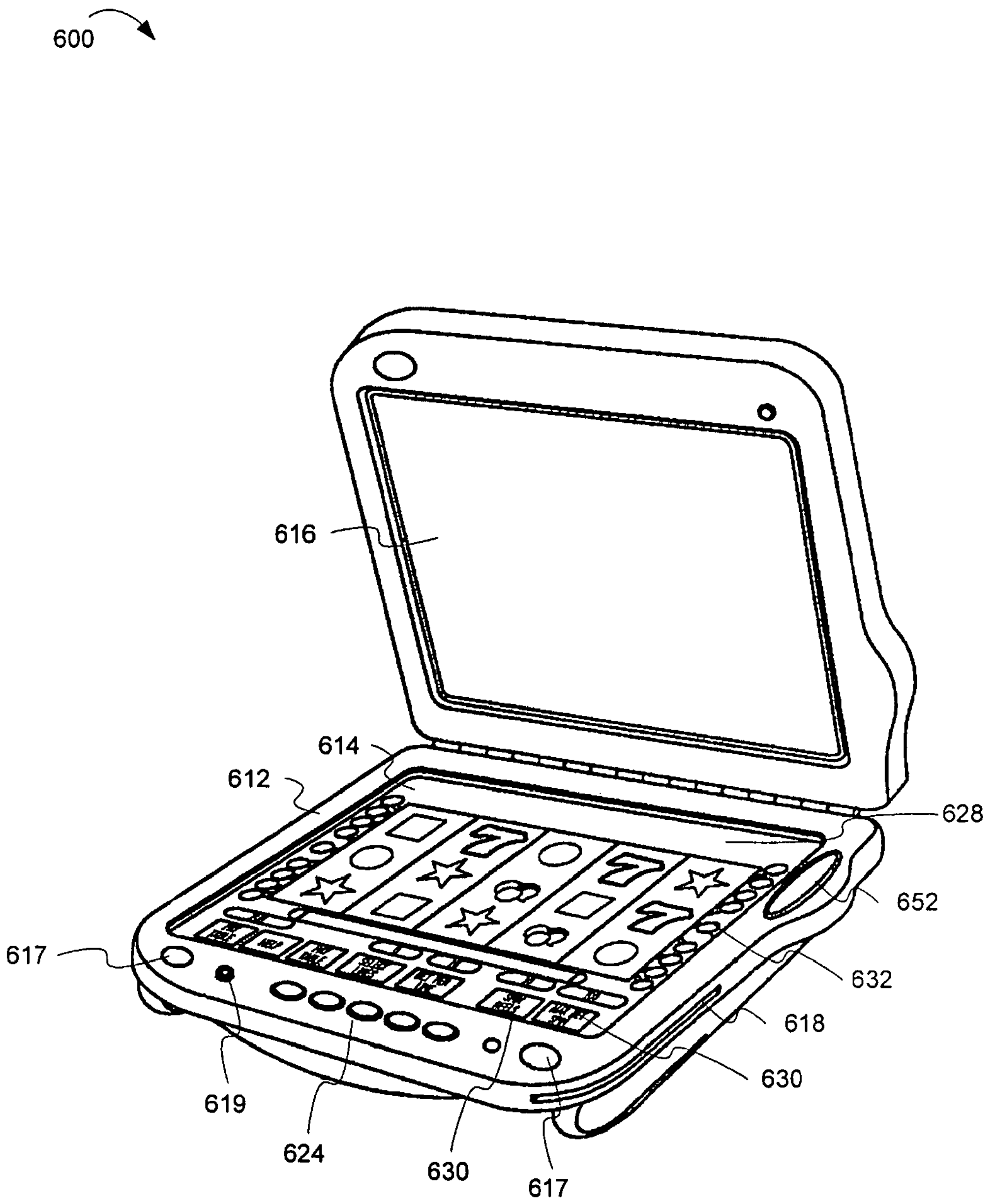
FIG. 6 is a perspective view of a portable wagering game machine, according to example embodiments of the invention.

FIG. 6 shows an example embodiment of a wagering game machine 600. Like free standing wagering game machines, in a handheld or mobile form, the wagering game machine 600 can include any suitable electronic device configured to play a video casino games such as blackjack, slots, keno, poker, blackjack, and roulette. The wagering game machine 600 comprises a housing 612 and includes input devices, including a value input device 618 and a player input device 624. For output, the wagering game machine 600 includes a primary display 614, a secondary display 616, one or more speakers 617, one or more player-accessible ports 619 (e.g., an audio output jack for headphones, a video headset jack, etc.), and other conventional I/O devices and ports, which may or may not be player-accessible. In the embodiment depicted in FIG. 6, the wagering game machine 600 comprises a secondary display 616 that is rotatable relative to the primary display 614. The optional secondary display 616 can be fixed, movable, and/or detachable/attachable relative to the primary display 614. Either the primary display 614 and/or secondary display 616 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 618 can comprise, for example, a slot located on the front, side, or top of the housing 612 configured to receive credit from a stored-value card (e.g., casino card, smart card, debit card, credit card, etc.) inserted by a player. The player-accessible value input device 618 can also comprise a sensor (e.g., an RF sensor) configured to sense a signal (e.g., an RF signal) output by a transmitter (e.g., an RF transmitter) carried by a player. The player-accessible value input device 618 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 600.

Still other player-accessible value input devices 618 can require the use of touch keys 630 on the touch-screen display (e.g., primary display 614 and/or secondary display 616) or player input devices 624. Upon entry of player identification information and, preferably, secondary authorization information (e.g., a password, PIN number, stored value card number, predefined key sequences, etc.), the player can be permitted to access a player's account. As one potential optional security feature, the wagering game machine 600 can be configured to permit a player to only access an account the player has specifically set up for the wagering game machine 600. Other conventional security features can also be utilized to, for example, prevent unauthorized access to a player's account, to minimize an impact of any unauthorized access to a player's account, or to prevent unauthorized access to any personal information or funds temporarily stored on the wagering game machine 600.

The player-accessible value input device 618 can itself comprise or utilize a biometric player information reader which permits the player to access available funds on a player's account, either alone or in combination with another of the aforementioned player-accessible value input devices 618. In an embodiment wherein the player-accessible value input device 618 comprises a biometric player information reader, transactions such as an input of value to the wagering game machine 600, a transfer of value from one player account or source to an account associated with the wagering game machine 600, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 618 comprising a biometric player information reader can require a confirmatory entry from another biometric player information reader 652, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 618 can be provided remotely from the wagering game machine 600.

The player input device 624 comprises a plurality of push buttons on a button panel for operating the wagering game machine 600. In addition, or alternatively, the player input device 624 can comprise a touch screen mounted to a primary display 614 and/or secondary display 616. In one aspect, the touch screen is matched to a display screen having one or more selectable touch keys 630 selectable by a user's touching of the associated area of the screen using a finger or a tool, such as a stylus pointer. A player enables a desired function either by touching the touch screen at an appropriate touch key 630 or by pressing an appropriate push button on the button panel. The touch keys 630 can be used to implement the same functions as push buttons. Alternatively, the push buttons 632, can provide inputs for one aspect of the operating the game, while the touch keys 630 can allow for input needed for another aspect of the game. The various components of the wagering game machine 600 can be connected directly to, or contained within, the housing 612, as seen in FIG. 6, or can be located outside the housing 612 and connected to the housing 612 via a variety of wired (tethered) or wireless connection methods. Thus, the wagering game machine 600 can comprise a single unit or a plurality of interconnected (e.g., wireless connections) parts which can be arranged to suit a player's preferences.

The operation of the basic wagering game on the wagering game machine 600 is displayed to the player on the primary display 614. The primary display 614 can also display the bonus game associated with the basic wagering game. The primary display 614 preferably takes the form of a high resolution LCD, a plasma display, an LED, or any other type of display suitable for use in the wagering game machine 600. The size of the primary display 614 can vary from, for example, about a 2-3" display to a 15" or 17" display. In at least some embodiments, the primary display 614 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 614 and/or secondary display 616 can have a 16:9 aspect ratio or other aspect ratio (e.g., 4:3). The primary display 614 and/or secondary display 616 can also each have different resolutions, different color schemes, and different aspect ratios.

As with the free standing embodiments a wagering gaming machine, a player begins play of the basic wagering game on the wagering game machine 600 by making a wager (e.g., via the value input device 418 or an assignment of credits stored on the handheld gaming machine via the touch screen keys 630, player input device 624, or buttons 632) on the wagering game machine 600. In some embodiments, the basic game can comprise a plurality of symbols arranged in an array, and includes at least one payline 628 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 618 of the wagering game machine 600 can double as a player information reader 652 that allows for identification of a player by reading a card with information indicating the player's identity (e.g., reading a player's credit card, player ID card, smart card, etc.). The player information reader 652 can alternatively or also comprise a bar code scanner, RFID transceiver or computer readable storage medium interface. In one embodiment, the player information reader 652 comprises a biometric sensing device.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A method comprising:

initializing a logical connection between a processing device and a wagering game network having one or more wagering game machines operable to present a wagering game upon which monetary value may be wagered;

locating at least one plug-in stored at a network device on the wagering game network by searching a predetermined file system directory on the network device to determine if the at least one plug-in exists as a file system directory, the plug-in comprising executable code and data; and when at least one plug-in is located in the predetermined file system directory:

authenticating by the processing device, the at least plug-in; and when the at least one plug-in is authenticated, loading the plug-in into an executable software program stored and operating on at least one wagering game machine on the wagering game network, the executable software program providing an interface for communication between the plug-in and the executable software program.

2. The method of claim 1, further comprising registering one or more functions within the plug-in with the application.

3. The method of claim 2, wherein the one or more functions include callback functions.

4. The method of claim 2, wherein the one or more functions include event handler functions.

5. The method of claim 1, wherein the plug-in includes a random number generator plug-in.

6. The method of claim 5, wherein locating further comprises locating the random number generator plug-in based on a jurisdiction where the random number generator plug-in is approved.

7. The method of claim 1, wherein the plug-in includes a protocol translator plug-in.

8. The method of claim 7, further comprising using the protocol translator plug-in to convert communication between a proprietary protocol and a standard protocol.

9. The method of claim 8, wherein the standard protocol a protocol defined by the Gaming Standards Association.

10. The method of claim 1, wherein the plug-in includes a player tracking plug-in.

11. An apparatus comprising:

at least one processor and a memory;

a software program stored in the memory and executable by the at least one processor and operable to provide support for a wagering game upon which monetary value may be wagered and to provide a plug-in interface; and a plug-in comprising executable code and data, the plug-in loadable into the software program during the run-time of the software program, the plug-in and software program communicating through the plug-in interface, wherein the software program is operable to locate the plug-in stored by searching a predetermined file system directory at a network device on a wagering game network to determine if the at least one plug-in exists as a file in the file system directory; and wherein the software program is further operable to authenticate the plug-in before providing the plug-in in the plug-in interface.

12. The apparatus of claim 11, wherein the software program executes on a wagering game machine.

13. The apparatus of claim 11, wherein the software program executes on a server on a wagering game network.

14. The apparatus of claim 11, wherein the plug-in resides at a network location and is downloadable by the software program.

15. The apparatus of claim 11, wherein the plug-in is included in at least one of a dynamically loadable library (DLL) or a shared object library.

16. The apparatus of claim 11, wherein the plug-in includes a random number generator plug-in.

17. The apparatus of claim 16, wherein the software program executable by the at least one processor is operable to select the random number generator plug-in based on a jurisdiction where the random number generator plug-in is approved.

18. The apparatus of claim 11, and further comprising a second plug-in loadable into the plug-in.

19. The apparatus of claim 11, further comprising a plug-in interface between the software program and the plug-in.

20. The apparatus of claim 19, wherein the interface comprises a registration interface and wherein callback routines within the plug-in are registered with the software program.

21. The apparatus of claim 19, wherein the interface comprises a predetermined routine within the plug-in and a data structure defining actions to be performed by the plug-in.

22. The apparatus of claim 19, wherein the interface includes a dynamically load library interface.

23. The apparatus of claim 11, wherein the plug-in includes a protocol translator plug-in.

24. The apparatus of claim 23, wherein the plug-in is operable to convert communication in a proprietary protocol to a standard protocol.

25. The apparatus of claim 24, wherein the standard protocol a protocol defined by the Gaming Standards Association.

26. The apparatus of claim 11, wherein the plug-in includes a player tracking plug-in.

27. A non-transitory machine-readable storage medium having machine executable code stored thereon for causing one or more processors to execute a method, the method comprising:

communicating on a wagering game network having one or more wagering game machines operable to present a wagering game upon which monetary value may be wagered;

locating at least one plug-in stored at a network device on the wagering game network searching a predetermined file system directory on the network device to determine if the at least one plug-in exists as a file in the file system directory, the plug-in comprising executable code and data; and when at least one plug-in is located in the predetermined file system directory:

authenticating the at least one plug-in; and when the at least one plug-in is authenticated, loading the at least one plug-in into an executable software program stored and operating on at least one machine on the wagering game network, the executable software program providing a plug-in interface for communication between the plug-in and the executable software program.

28. The machine-readable storage medium of claim 27, wherein the method further comprises registering one or more functions within the plug-in with the application.

29. The machine-readable storage medium of claim 28, wherein the one or more functions include callback functions.

30. The machine-readable storage medium of claim 28, wherein the one or more functions include event handler functions.

31. The machine-readable storage medium of claim 27, wherein the plug-in includes a random number generator plug-in.

32. The machine-readable storage medium of claim 31, wherein locating further comprises locating the random number generator plug-in based on a jurisdiction where the random number generator plug-in is approved.

33. The machine-readable storage medium of claim 27, wherein the plug-in includes a protocol translator plug-in.

34. The machine-readable storage medium of claim 33, further comprising the method of using the protocol translator plug-in to convert communication between a proprietary protocol and a standard protocol.

35. The machine-readable storage medium of claim 34, wherein the standard protocol a protocol defined by the Gaming Standards Association.

36. The machine-readable storage medium of claim 27, wherein the plug-in includes a player tracking plug-in.

* * * * *

UNITED STATES PATENT AND TRADEMARK OFFICE

CERTIFICATE OF CORRECTION

PATENT NO. : 8,449,394 B2
APPLICATION NO. : 12/665162
DATED : May 28, 2013
INVENTOR(S) : Buchholz et al.

It is certified that error appears in the above-identified patent and that said Letters Patent is hereby corrected as shown below:

In the Specification

In column 1, line 9, delete “Al” and insert --A1--, therefor

In the Claims

In column 12, line 42, in claim 1, after “file”, insert --in the file--, therefor In column 12, line 47, in claim 1, after “least”, insert --one--, therefor In column 13, line 6, in claim 9, after “protocol”, insert --is--, therefor In column 13, line 51, in claim 20, after “a”, insert --non-transitory--, therefor In column 14, line 5, in claim 25, before “a”, insert --is--, therefor In column 14, line 18, in claim 27, after “network”, insert --by--, therefor In column 14, line 55, in claim 35, after “protocol”, insert --is--, therefor Signed and Sealed this
Fifteenth Day of October, 2013

Teresa Stanek Rea
*Deputy Director of the United States Patent and Trademark Office*

UNITED STATES PATENT AND TRADEMARK OFFICE

CERTIFICATE OF CORRECTION

PATENT NO. : 8,449,394 B2
APPLICATION NO. : 12/665162
DATED : May 28, 2013
INVENTOR(S) : Buchholz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
Eighth Day of September, 2015

Michelle K. Lee
*Director of the United States Patent and Trademark Office*